Figures 1, 2:
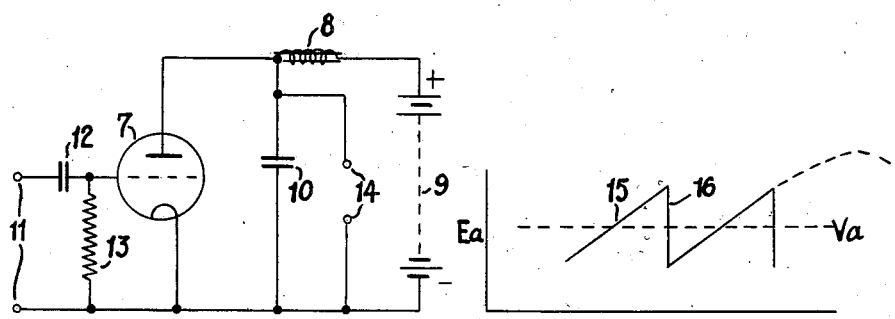

Jan. 30, 1940.   C. L. FAUDELL ET AL   2,188,653
ELECTRONIC OSCILLATION GENERATOR
Filed April 12, 1937

INVENTORS
CHARLES L. FAUDELL
ERIC L. C. WHITE
BY
ATTORNEY

Patented Jan. 30, 1940

2,188,653

UNITED STATES PATENT OFFICE 2,188,653

ELECTRONIC OSCILLATION GENERATOR

Charles Leslie Faudell, Acton, London, and Eric Lawrence Casling White, Hillingdon, England, assignors to Electric & Musical Industries Limited, Hayes, Middlesex, England, a company of Great Britain Application April 12, 1937, Serial No. 136,262
In Great Britain February 4, 1936

3 Claims. (Cl. 250—36)

This invention relates to electric relaxation oscillation generators and has particular, although not exclusive, reference to such generators when employed as time bases for television purposes.

One known form of relaxation oscillation generator comprises a thermionic valve having a coil in its anode circuit coupled to a coil in its grid circuit for the generation of oscillations, the valve being periodically rendered conducting on the application of controlling or synchronising pulses thereto, in order to initiate bursts of oscillation, such oscillation continuing until the valve is rendered non-conducting due, for example, to the control grid acquiring such a negative potential that anode current ceases to flow through the valve. A condenser is provided which, during the bursts of oscillation, is rapidly charged and is discharged when the valve is non-conducting, charging and discharging of the condenser occurring in such a manner that the voltage wave set up across the condenser is of substantially saw-tooth form. Such a form of oscillation generator is known as a blocking oscillator.

Another form of relaxation oscillation generator comprises a thermionic valve, the anode of which is connected through a resistance to the positive terminal of a source of anode current and a condenser is provided in the anode-cathode circuit of the valve. The valve is arranged to be rendered periodically conducting and non-conducting whereby during the period when the valve is non-conducting the condenser is charged through the resistance and when the valve is rendered conducting the condenser is discharged, the voltage waves set up across the condenser during the charging and discharging period also being of a substantially saw-tooth form.

These saw-tooth shaped potentials are frequently employed for deflecting a cathode ray beam in such a manner as to trace out the raster on a television receiving tube, the number of lines in the raster being determined by the frequencies of the applied line and frame saw-tooth oscillations whilst the length of the lines traced out are determined by the amplitude of the line saw-tooth oscillations.

In the usual form of oscillation generator the frequency of the generated oscillations is determined by controlling or synchronising pulses applied to the generator and in the case of an oscillation generator employed as a time base for television receiving purposes synchronising pulses are transmitted and received and applied in suitable phase to the oscillation generator. If, for any reason, the frequency of the synchronising pulses varies, then with the known form of oscillation generator the amplitude of the saw-tooth potentials generated correspondingly varies. This variation in amplitude results in a variation in the length of the lines traced out by the cathode ray beam with a consequent displacement of one end of the line to the left and the other end to the right. In a special case in which the line frequency pulses are not transmitted during the frame synchronising intervals and in which the line frequency generator, in the absence of the pulses, has a natural frequency somewhat lower than the frequency of the line pulses, it is found that the lines scanned while the line pulses are absent causes upper portions of the vertical edges of the raster to become hook-shaped. Such distortion is, colloquially referred to as "hooking."

It is the chief object of the present invention to provide a method of operating a relaxation oscillation generator whereby the generated oscillations are of a substantially constant amplitude despite variations in the frequency of the synchronising or other controlling pulses, the method being mainly for use where the generator is employed in television receiving or transmitting systems with a view to reducing the distortion above referred to.

According to the invention a method of operating a relaxation oscillation generator is provided, which generator comprises a thermionic valve having at least a cathode, control grid and an anode, a source of anode current for said valve, a condenser arranged to be charged from said source of current and an inductance associated with said condenser to form therewith an oscillatory circuit, the method consisting in applying to said valve controlling impulses whereby said valve is rendered conducting for short periods at intervals and non-conducting during the periods between said intervals and in arranging that the time constant of said oscillatory circuit is long compared with the intervals between the control impulses applied to said valve whereby during the periods that the said valve is non-conducting the said condenser is charged or discharged through said inductance so as to generate oscillations of substantially saw-tooth form and of substantially constant amplitude despite variations in the frequency of the controlling impulses applied to said valve.

With such an arrangement it will be appreciated that if the frequency of the applied synchronising pulses is changed within limits determined by the constants of the generator, then the amplitude of the oscillations generated is maintained substantially constant. In a television system the "hooking" which occurs as a result of the temporary absence of the line synchronising signals is by employing an arrangement in accordance with the invention substantially reduced.

The relaxation generator employed in the invention may be of the simple type in which the anode of the valve is connected through the inductance to the source of anode current and the condenser is connected between the anode end of the inductance and the cathode and controlling pulses are applied to the grid of the valve or it may be in the form of a blocking oscillator which is itself oscillatory in the absence of controlling pulses. The invention can also be applied to other forms of relaxation oscillation generators.

Figures 3, 4:
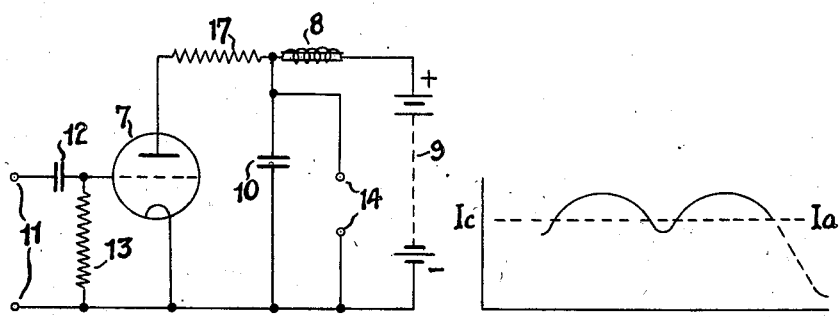
Figures 5, 6:
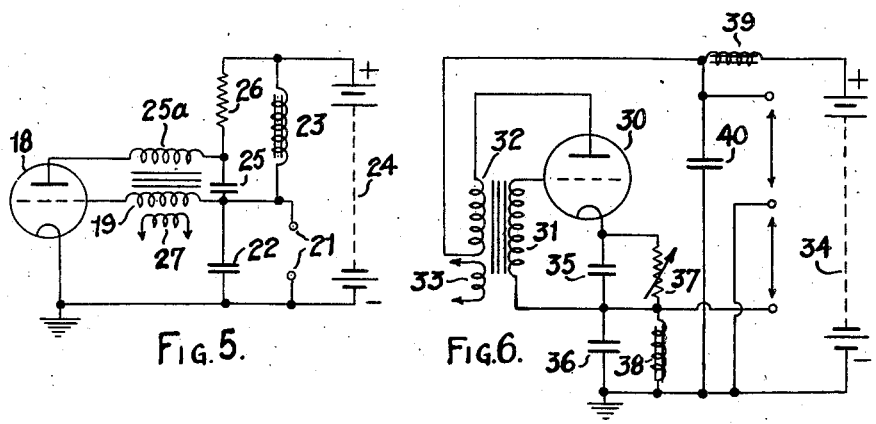

In order that the said invention may be clearly understood and readily carried into effect the same will now be more fully described with reference to the accompanying drawing in which:

Fig. 1 is a circuit diagram of one form of relaxation oscillator for use in the invention, Figs. 2 and 3 are explanatory diagrams, Fig. 4 is a circuit diagram of a modified form of relaxation oscillator generator similar to that shown in Fig. 1, and Figs. 5 and 6 are two embodiments of a blocking oscillator which may be employed in the invention.

As shown in Fig. 1, the relaxation oscillator comprises a triode valve 7, the anode of which is connected through an inductance 8 in the form of an iron cored choke coil to the positive terminal of a source of anode current indicated by a battery 9, the negative terminal of which is connected to the cathode of the valve 7. Between the anode end of the inductance 8 and the cathode of the valve 7 a condenser 10 is arranged, this condenser 10, during the period that the valve 7 is non-conducting being charged from the source 9 through the inductance 8. Controlling or synchronising pulses are applied to input terminals 11 between grid and cathode of the valve 7, these pulses being applied through a condenser 12, a leak resistance 13 being provided between grid and cathode as shown. Where the oscillator shown in Fig. 1 is employed in a television receiving system, the synchronising pulses transmitted may be applied to the valve 7 in the positive sense so that on application of a synchronising pulse the valve 7 is rendered conducting for a predetermined period. The valve 7 is subsequently rendered non-conducting and the condenser 10 charges at a substantially constant rate through the inductance 8 and on the application of the synchronising pulse to the valve 7 the valve is again rendered conducting causing discharge of the condenser 10, the charging period generating the long flank of the saw-tooth wave and the discharging of the condenser 10 generating the short flank of the saw-tooth wave, the oscillation so generated being taken from the output terminals 14 across the condenser 10. The inductance 8 and the condenser 10 form an oscillatory circuit the time period of which must be long compared with the interval between the controlling pulses applied to the terminals 11.

It will be found that by suitable choice of the components of the circuit shown in Fig. 1 that the circuit functions to generate a substantially constant amplitude of saw-tooth wave across the condenser 10 despite variations in the frequency of the controlling pulses applied to the valve 7.

An explanation for the functioning of the circuit in this manner will now be described with reference to Figs. 2 and 3 of the drawing. The curves shown in Figs. 2 and 3 illustrate respectively the anode voltage of the valve 7 and the current flowing through the inductance 8. In Fig. 2 the anode voltage $Ea$ is plotted as the ordinates against time as the abscissae and in Fig. 3 the current $Ic$ through the inductance 8 is plotted as the ordinates against time as the abscissae. Now, if after a certain time the valve 7 were continuously non-conducting the anode voltage $Ea$ would perform a sine-wave oscillation following approximately the dotted line curve shown in Fig. 2 and the current through the inductance 8 under the same conditions would follow the dotted line curve shown in Fig. 3. Since, however, the valve 7 is periodically rendered conducting the anode voltage of the valve 7 will follow substantially the full line form shown in Fig. 2 and the current through the inductance 8 will tend to follow the full line curve in Fig. 3. The slow-rising or long flank 15 of the saw-tooth voltage wave as shown in Fig. 2 is generated during charging of the condenser 10 when the valve 7 is non-conducting and the short flank 16 of the saw-tooth wave is generated when the valve 7 is rendered conducting, thereby discharging the condenser 10. It will be observed that the long flank 15 of the saw-tooth voltage wave forms a part of the sine-wave oscillation. Now, neglecting the direct current resistance of the inductance 8 the mean anode voltage indicated by $Va$ in Fig. 2 must be the same as that at the positive terminal of the source 9. The mean current through the inductance 8 is indicated at $Ia$ in Fig. 3. During the longer part of the cycle, that is to say, when the valve 7 is non-conducting and the condenser 10 is charging, the system acts as a lightly-damped resonant circuit and to a first approximating the equations of the dotted line curves shown in Figs. 2 and 3 will be:

$$Ea = Va + E \sin \omega_0 t$$
$$Ic = I \cos \omega_0 t$$

where $\omega_0$ is $2\pi$ times the natural frequency of oscillation of the inductance 8 and condenser 10. Now, since the discharge period is very small compared with the natural period of the oscillatory circuit, the current taken by the inductance 8 can be considered as constant during this period and each cycle of current will, to a first approximation, commence where the previous one ended. Both series of curves are, therefore, symmetrical about the mid-point of the long flank 15 of the saw-tooth wave, and thus about the mean voltage $Va$. The lowest voltage to which the anode of the valve 7 falls is primarily a function of the valve. This is due to the fact that the discharge continues until the valve current falls to that through the choke, providing that the discharge period is sufficiently long which can be insured by a suitable choice of the condenser 10 and inductance 8. By employing for the valve 7 a valve having a pentode characteristic, the lowest voltage to which the anode of the valve falls will be approximately zero. Consequently, the lower excursion of the anode voltage, and hence the upper excursion, will be independent of the frequency of the discharging impulses. The rate of rise of anode voltage is proportional to the discharging frequency, since the rate of charge depends on the value to which the mean current through the inductance has been raised by the regular succession of the preceding discharges. The current passing through the valve during each discharge is independent of the interval between the discharge periods and the mean current to which the instantaneous current through the inductance will always approximate is thus directly proportional to the discharge frequency. The current flowing through the inductance 8 will at the instant when the valve is rendered non-conducting suffice to raise the anode voltage to the same value independently of the interval between discharges.

An oscillation generator is, of course, generally supplied with controlling pulses the frequency of which is maintained constant as far as possible. However, for various reasons the intervals, particularly where the controlling pulses are transmitted from a distance, are liable to vary for short periods. The circuit shown in Fig. 1 has been found to provide a substantially constant amplitude of saw-tooth wave despite variations in the interval between the controlling pulses applied to the terminals 11, providing that the interval remains constant for a sufficient time to enable the circuit to become stabilised.

The circuit operating in accordance with the invention does not, however, become instantaneously adjusted to provide a constant amplitude of oscillations. For example, if the interval between the controlling pulses is suddenly increased discharge of the condenser 10 continues along the dotted line curves of Fig. 2 and the period taken for the circuit to recover the constant amplitude of saw-tooth at the new periodicity will be a function of the natural period of the oscillatory circuit. The recovery to constant amplitude may be exponential or a damped train of oscillations according to the damping imposed by the valve 7 on the circuit. With a circuit operating in accordance with the invention the "hooking" which occurs as referred to above is considerably reduced and the period of the reduced degree of "hooking" is substantially that of the period of the resonant circuit.

In one specific embodiment of circuit according to Fig. 1 designed for generating a saw-tooth oscillation of a frequency of 10,125 per second for use in a television receiver, in which scanning is accomplished in 405 lines with 25 pictures per second, the value of the inductance 8 may be 40 henries, the capacity of the condenser 10, 0.001 microfarad, and the valve 7 may be of the Marconi or Osram type known as MSP4 or MS4B.

In Fig. 4 of the drawing a circuit similar to that shown in Fig. 1 is illustrated with the exception that a resistance 17 is included in series with the inductance 8, the condenser 10 being connected between the join of the resistance 17 and the inductance 8 as shown. In this arrangement the resistance 17 which may be one or a few thousand ohms functions as a limiting resistance whereby the discharging current is always of the same value. Since from the description of Figs. 1 to 3 it is evident that discharge of the condenser 10 continues for the same period at all times, the charge extracted from the condenser 10 of Fig. 4 during each cycle is constant. The circuit shown in Fig. 4 is also found to provide a substantially constant amplitude of saw-tooth oscillation despite variations in frequency of the controlling pulses although the circuit shown in Fig. 4 differs slightly in its operation compared with that shown in Fig. 1 due to a variation in its transitional response to a change in frequency of the controlling pulses.

Fig. 5 of the drawing illustrates one form of a relaxation oscillator of the blocking type which may be employed in the invention. As shown in this figure a triode valve 18 has its control grid connected through one winding 19 of a three coil iron cored transformer to one of the output terminals 21 and its cathode connected to the other of the output terminals 21 which is earthed. A condenser 22 is connected between the output terminals 21 and the side of condenser 22, which is remote from the cathode, is connected through an inductance 23 in the form of an iron cored choke coil to the positive terminal of a source of anode current indicated by a battery 24 which has its negative terminal earthed as shown. Alternatively, the inductance 23 may be shunted across the condenser 22.

The anode of the valve 18 is connected through a second winding 25ª of the transformer and a resistance 26 in series to the positive terminal of the anode current source 24 and the anode end of the resistance 26 is connected through a decoupling condenser 25 to the control grid side of the condenser 22. The third winding 27 of the transformer functions to impress controlling pulses on to the winding 19. On the application of a controlling pulse, a burst of oscillation occurs and anode current flows in the valve. Condenser 22 is charged negatively, as usual, by the flow of grid current. Owing to the connection of the decoupling condenser 25 to the grid side of the condenser 22, the latter condenser supplies the impulse of anode current and its negative charge is thus increased above that provided by the grid current. The mean negative potential set up across condenser 22 with respect to the cathode thus rapidly reaches a value greater than that corresponding to anode current cut-off; the oscillations are thus blocked and the charge on condenser 22 is then neutralised by the flow of current from the source 24 through the inductance 23, and the cycle recommences.

A voltage wave of saw-tooth wave form is thus set up across the condenser 22 and it will be found that the amplitude of the voltage wave so generated will be substantially independent of the frequency of the controlling pulses. It will be seen that the anode current as well as the grid current contributes to the charging of the condenser 22, but this feature is claimed in the specification of our co-pending application Serial No. 123,764, filed February 3, 1937, and entitled "Electronic oscillation generators".

Fig. 6 of the drawing illustrates another form of blocking oscillator for use in the invention in which the circuit is arranged to generate simultaneously saw-tooth voltage waves of opposite phase. In this case, the grid and anode of a triode valve 30 are coupled through the medium of two windings 31 and 32 of a three coil iron cored transformer the third winding 33 of the transformer being employed for applying synchronising pulses to the circuit. Between the cathode of the valve and the negative terminal of an associated source of anode current indicated by battery 34, two condensers 35 and 36 are connected in series which are shunted by a variable resistance 37 and an iron-cored choke coil 38 respectively.

An iron cored choke coil 39 is inserted in series between the anode coil 32 of the transformer and the positive terminal of the high tension current source 34, a condenser 40 being connected between the anode end of the choke 39 and the high tension negative lead. In this construction the inductances of 38 and 39 are of similar value and the capacities of the condensers 36 and 40 are adjusted so that the voltage waves set up across the condenser plates are equal in magnitude and opposite in phase, the condenser 35 being sufficiently large to constitute a bypass for the current which flows from condenser 40 into condenser 36 when the valve is conducting. The outputs in opposite phase are taken from the two condensers 36 and 40. The inductances 41 and 42 are preferably of low resistance whereby high output voltages can be obtained with comparatively small high tension voltages. With this arrangement the condenser 40, when the valve is non-conducting, is charged through the inductance 39, whilst during the charging of the condenser 40 the condenser 36 is discharging through the inductance 38. In this case also it will be found that the voltage waves generated at the condensers 36 and 40 in opposite phase will be substantially independent of the frequency of the controlling pulses.

Other forms of relaxation oscillation generators may also be employed in the invention and, in particular, those referred to in the specification of our co-pending application Serial No. 123,764, filed February 3, 1937, and entitled "Electronic oscillation generators".

We claim:

1. An oscillation generator comprising means for supplying direct current to a series resonant network of predetermined time period, means for thermionically varying an impedance path across only one element of the network periodically under the control of energy impulses spaced in time less than the predetermined time period of the resonant network, and means for deriving saw-tooth wave energy from the element.

2. An oscillation generator comprising means for supplying direct current to a series resonant network of predetermined time period, means for thermionically short-circuiting only one element of the network periodically under the control of energy impulses spaced in time less than the predetermined time period of the resonant network, and means for deriving saw-tooth wave energy from the element.

3. An oscillation generator comprising a source of direct current, a serially connected inductance and condenser having two terminals connected across the source of current, said inductance and capacity having a resonant frequency lower than one quarter the frequency of the energy impulses, a thermionic tube having a cathode, a control electrode, and an anode, a direct connection from one terminal of the condenser to the anode of said tube, and a direct connection from the other terminal of the condenser to the cathode of said tube, means to feed energy impulses between the control electrode and cathode and terminal connections across the condenser to derive saw-tooth wave energy therefrom.

CHARLES LESLIE FAUDELL.
ERIC LAWRENCE CASLING WHITE.